May 16, 1933.  A. E. NELSON  1,909,001
STONE CUTTING MECHANISM
Filed June 13, 1932   5 Sheets-Sheet 4
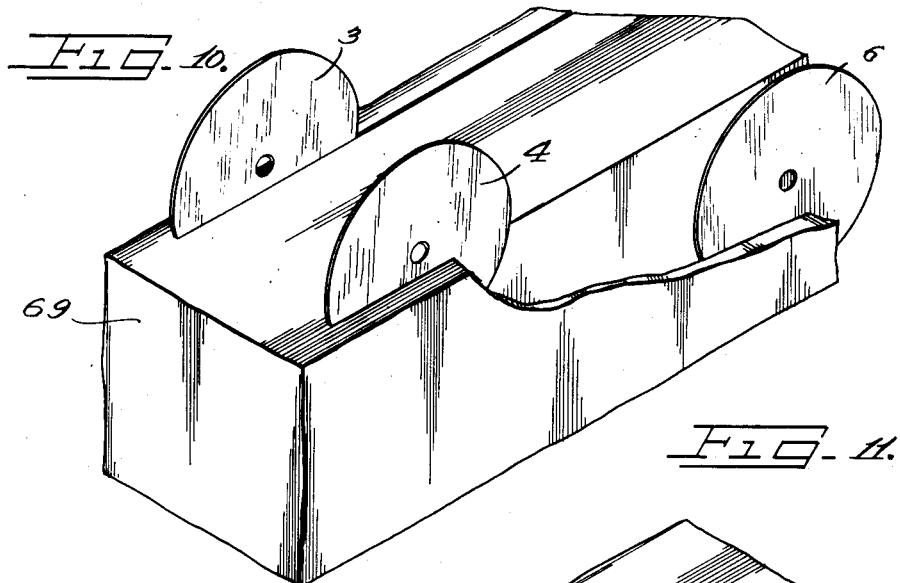
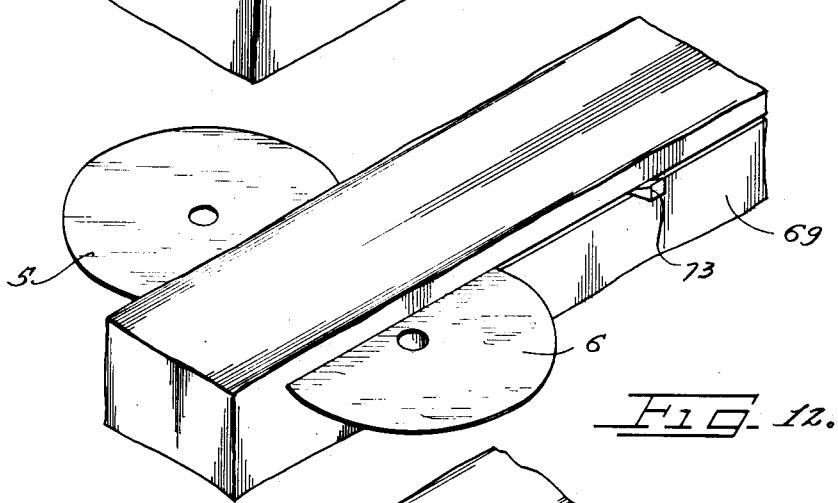
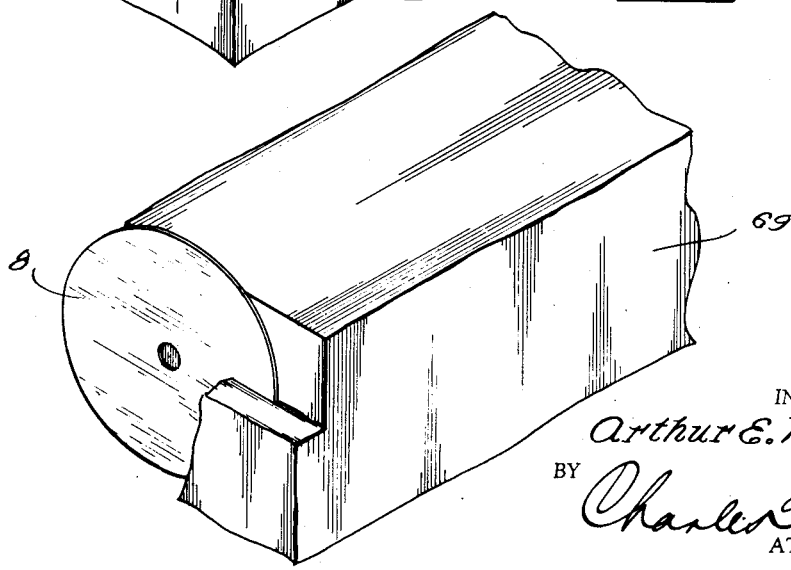
INVENTOR.
Arthur E. Nelson.
BY
ATTORNEY.

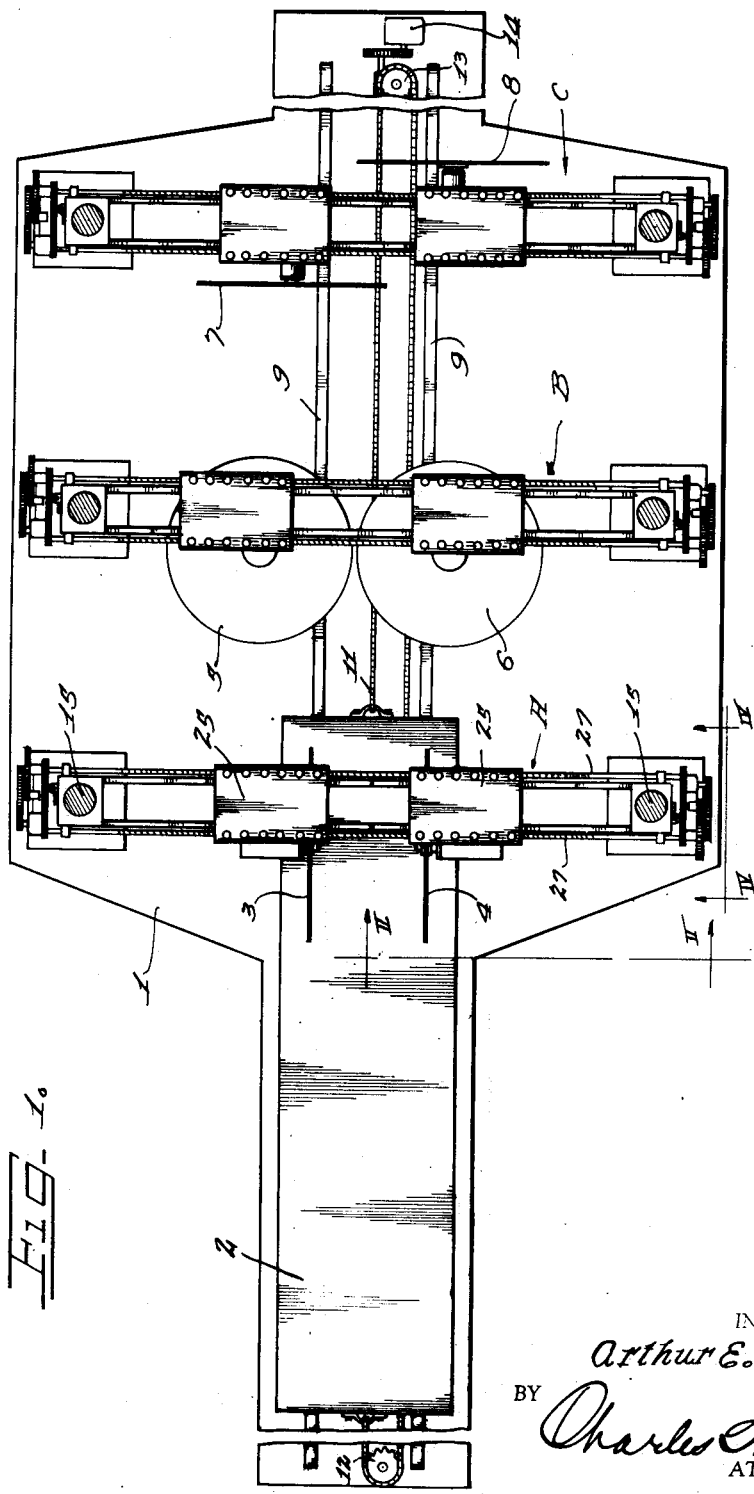

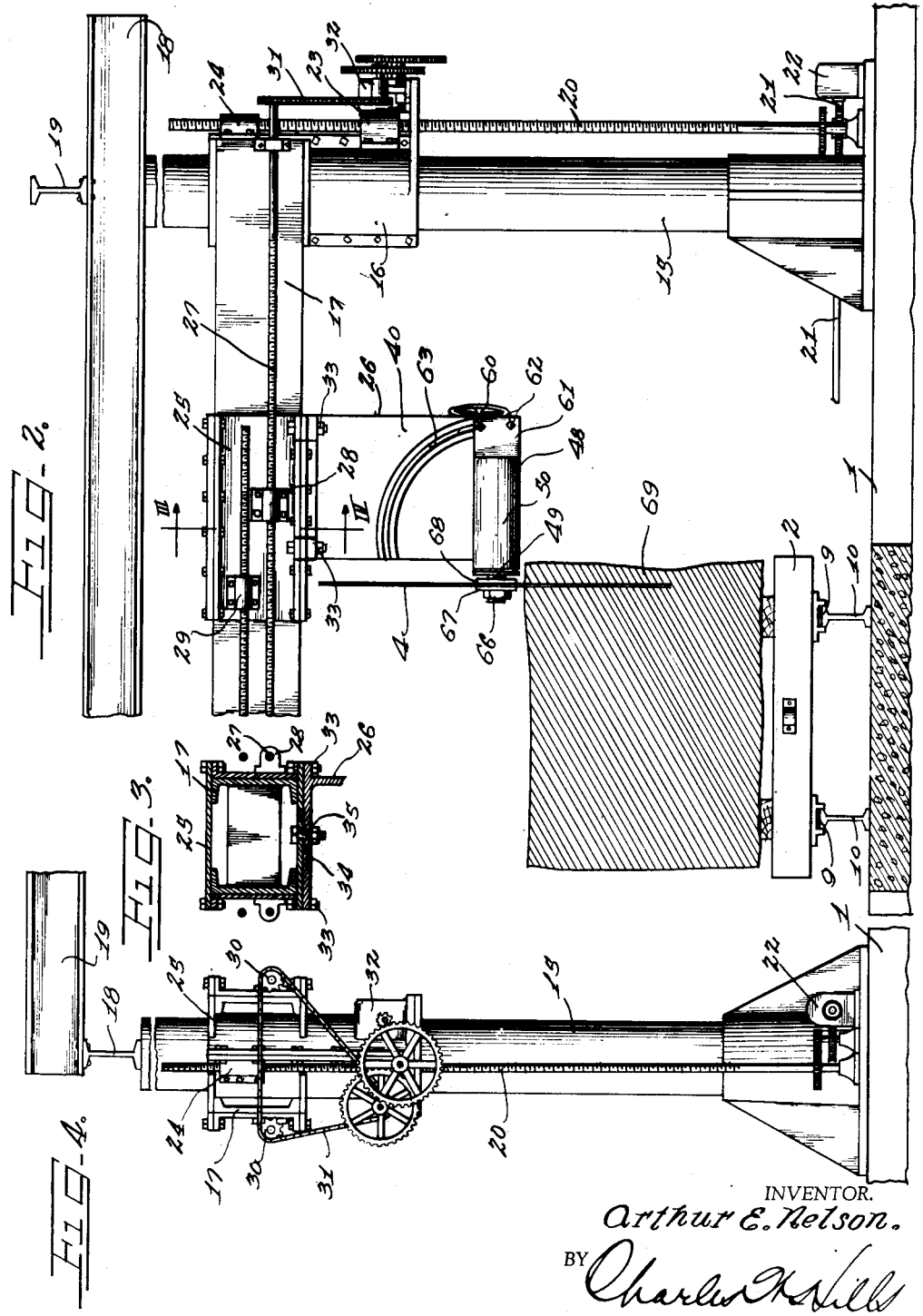

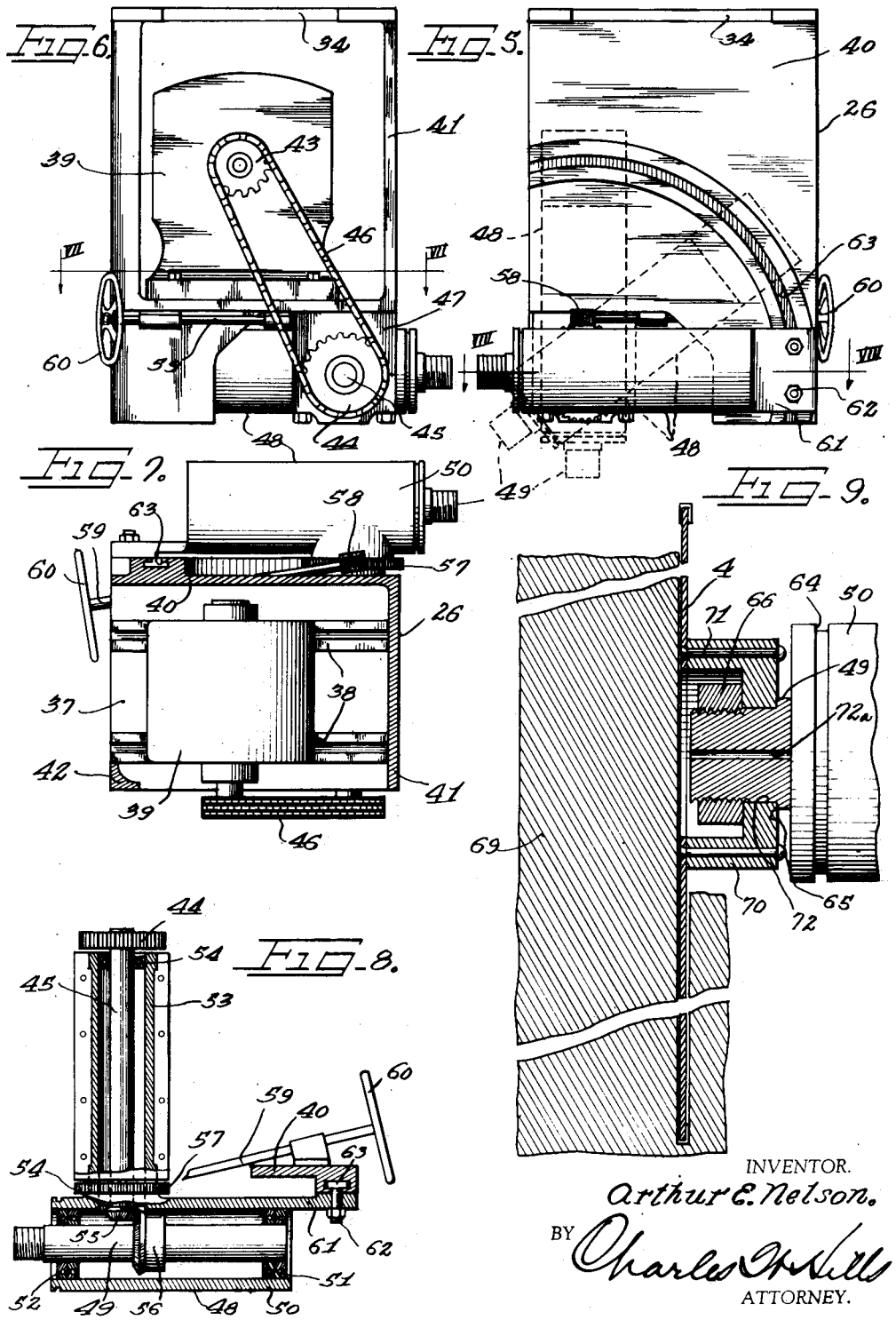

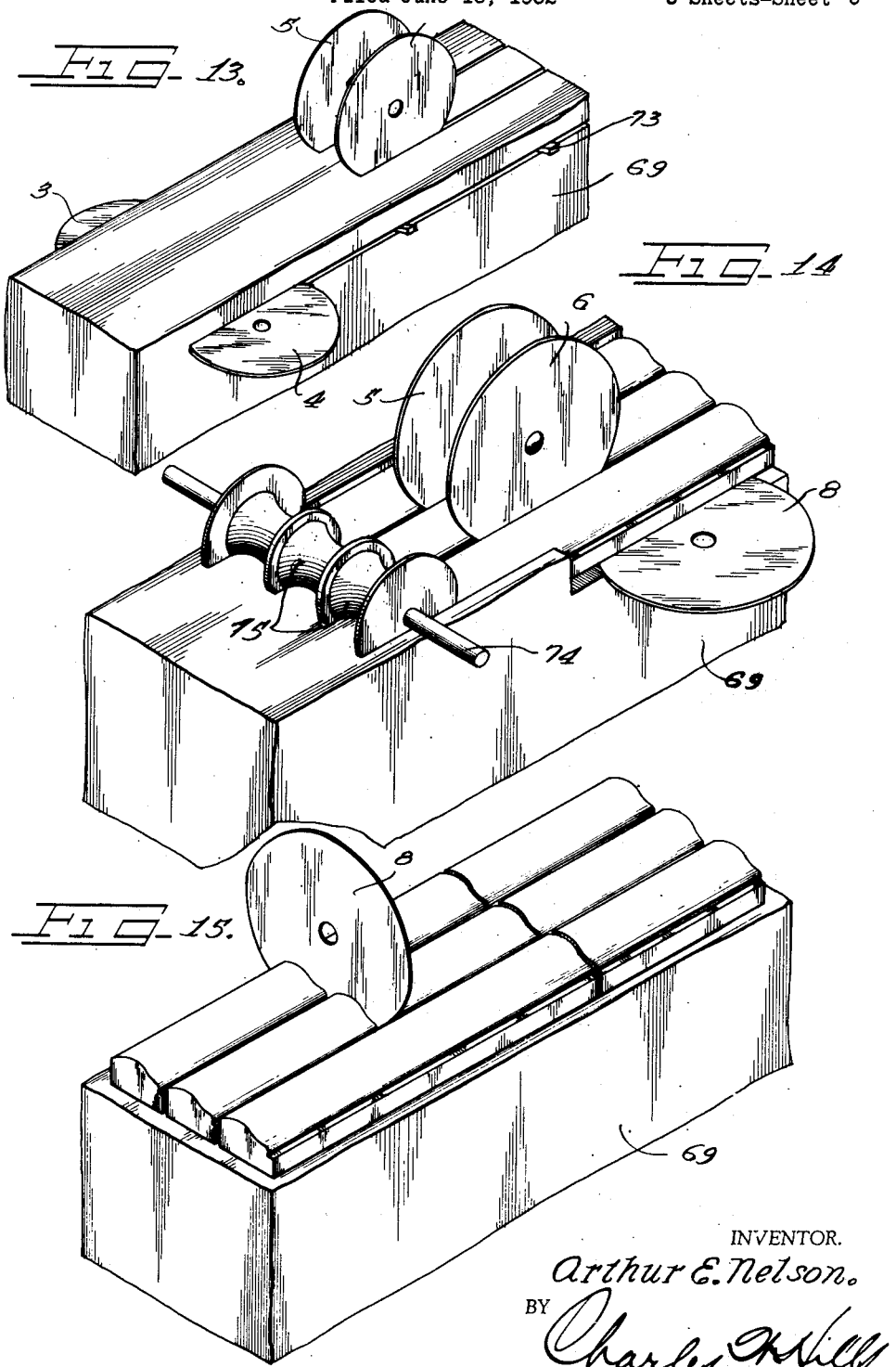

Patented May 16, 1933

1,909,001

UNITED STATES PATENT OFFICE

ARTHUR E. NELSON, OF CHICAGO, ILLINOIS

STONE CUTTING MECHANISM

Application filed June 13, 1932. Serial No. 616,769.

This invention relates to a mechanism for working stone, granite, marble or the like into various finished shapes such as are commonly known as scabbled stone, slab stone, stone ashlar, molded stone, et cetera; and is primarily concerned with a mechanism for this purpose which may be located at the quarry and is so designed and constructed as to enable a plurality of working tools, such as saws, carborundum blades and carborundum wheels to be simultaneously and successively applied to the stone without the necessity of having to change the original setting of the stone.

Heretofore, machines of this character for sawing stone have in most cases been built with a single blade having a carborundum rim or inserted teeth containing diamonds which, when rotated with sufficient power and with water spraying at the cut, may be used to cut slots or separate the stone being cut. These machines are usually one of two types; first, where the stone is placed on a car and moved to the desired cutting position under the saw, the stone then being set or secured in any well known manner so as to be held stationary during the cutting operation. In this ̭ ̰e, the saw blade and its driving motor are supported on a movable carriage which may be actuated to carry the saw across the stone during the cutting operation. In the second type, the stone is mounted on a platen which is arranged to carry the stone past the rotating saw during the cutting operation. It will be apparent to those familiar with the art that machines of these types are objectionable in that a considerable amount of time must necessarily be consumed in resetting the stone for each cutting operation and, also, because the character of cut which may be taken is quite limited.

In order to overcome these and other objections to the present types of stone cutting machines, this invention proposes to provide a plurality of adjustable saws and an adjustable platen. It is contemplated that the stone to be cut will be secured to the platen which is arranged with a feed mechanism whereby it may be continuously moved forward or backward to carry the stone past the saws when making longitudinal cuts or the feed mechanism may be used to adjust the stone relative to the saws when making horizontally spaced transverse cuts. In the latter case, the saws would be fed in the same plane each time and the platen adjusted to move the stone for making each successive cut therethrough.

The saws are preferably mounted in pairs, each pair being arranged to be raised or lowered as a unit independently of the other pairs. All the saws are individually adjustable for rotation in horizontal or vertical planes and an individual feed mechanism is provided by means of which the saws may be fed towards or away from the stone in making transverse cuts and for adjusting the saws for making horizontally spaced longitudinal cuts when the stone is moved through the saws by the platen feed mechanism.

Moreover, the arrangement of the saws in pairs and the provision of individual adjustments therefor, enables the saw arbors of each pair to be connected to and used for driving a spindle having carborundum wheels of various shapes thereon, whereby any desired moulding shape may be quickly and easily produced.

It is a further object of the present invention to provide a mechanism of the character described having a plurality of saws which are so arranged that they may be simultaneously applied to a plurality of sides of a stone in such a manner as to enable the stone to be scabbled in the shortest possible time without resetting.

It is a further object of the invention to provide a mechanism whereby finished stone may be produced, the finished stone being moulded on one side and sawed on the remaining five sides, without the necessity of having to reset the rough stock, that is, where the original stock is of such size as to be cut up into a number of finished forms, in order to continue the cutting of additional finished forms as the already finished forms are fabricated and removed.

A further object of the invention is to provide an improved arbor supporting structure and means for connecting the saw to the arbor, whereby a maximum of power may be applied to the saw and maximum clearance may be attained from the periphery of the saw to the arbor supporting structure regardless of the plane in which the saw is being rotated.

Another object of the invention is to provide an angularly adjustable head for the saw arbor, which is so constructed and designed as to enable maximum power to be applied to the saw regardless of the angle at which the saw is set.

It is also an object of the invention to provide improved means for connecting a saw to a rotatable arbor, wherein the outer face of the saw is free from projections, thus enabling the sawed surface of the stone being sawed to extend over and past the outer face of the saw without in any way interfering with the cutting operation, it being understood, of course, that the stone on the inner face of the saw is broken away before a new cut in the same plane is taken.

Other objects and features of this invention will more fully appear from the following detailed description taken in connection with the accompanying drawings which illustrate a single embodiment thereof, and in which Figure 1 is a plan view of a stone cutting machine embodying the features of the present invention;

Figure 2 is an enlarged fragmentary view in elevation, partly in section, showing the operative relationship between one of the saws and a stone placed on the platen or carriage for the stone taken substantially on line II—II of Figure 1;

Figure 3 is a transverse section showing details of the mounting of the saw carriage on one of the cross-rails, taken substantially on line III—III of Figure 2;

Figure 4 is a side view in elevation of one of the supporting columns or posts for the cross-rail showing the mechanism for raising and lowering the cross-rail and mechanism for moving the saw carriage along the cross-rail taken substantially on line IV—IV of Figure 1;

Figure 5 is an enlarged front elevational view of the saw carriage showing the angularly adjustable head for the saw;

Figure 6 is a rear view elevation of the same;

Figure 7 is a horizontal section through the saw carriage, taken substantially on line VII—VII of Figure 6;

Figure 8 is a fragmentary horizontal section through the saw carriage and arbor supporting head, taken substantially on line VIII—VIII of Figure 5;

Figure 9 is an enlarged fragmentary view partly in section showing the details of one method of securing the saw blade to its arbor; and Figures 10 to 15 are enlarged isometric views of the stone cutting element, illustrating the use of the present invention in producing various kinds of finished stone.

*As shown on the drawings*

As illustrated in the drawings, the stone cutting machine of this invention broadly embraces a reinforced concrete platform or base 1 which supports a platen 2 common to a plurality of stone working units, generally indicated as A, B and C. Each of these units includes a pair of saws: For example, unit A includes saws 3 and 4; unit B, saws 5 and 6; and unit C, saws 7 and 8. Although the drawings show three (3) unit pairs of saws, it is contemplated that a greater or less number of units may, if desired, be used; and, since the units are exactly similar in construction, it is thought that for purposes of description it will only be necessary to describe one unit in detail.

The platen is supported for longitudinal movement of the platform or base 1 upon flatways 9, which are preferably of bronze, mounted on spaced structural members 10 which are shown in this instance as being I-beams.

The platen is moved back and forth along the ways by means of a feed mechanism comprising a chain 11, as shown in Figure 1, which is secured at its ends to the ends of the platen 2. This chain is looped around an idler sprocket 12 at one end of the platform and a driving sprocket 13 at the opposite end of the platform. The driving sprocket is operatively connected through suitable gears to a motor 14 which is provided with conventional speed control, whereby it is possible to quickly and easily feed the platen back and forth at various speeds.

Each working unit, for example, unit A, comprises a pair of upright columns 15—15 which are laterally spaced on each side of the platen and respectively provided with sleeves 16 which are axially slidable with respect to the columns. These sleeves are connected to a cross-rail 17 which extends across the platen and serves as a support for the saw supporting structures which will be described subsequently in detail. The top ends of the columns 15 of each unit are interbraced by means of a frame structure composed of transverse members 18 and longitudinally extending members 19 which are interconnected together in any well-known manner such as by rivets.

The cross-rail may be raised and lowered through the actuation of a vertically disposed screw 20, as shown in Figures 2 and 4, which is associated with each of the columns of a unit. The lower ends of the screws 20 of each unit are connected through suitable gearing to a common shaft 21 which is driven by a motor 22 provided with conventional control equipment to enable the motor to be operated in forward and reverse directions at varied speeds. The upper end of each screw 20 extends through a nut 23 with which it is in threaded engagement. This nut is mounted on the sleeve 16. Disposed above the nut 23 on each sleeve is a slide bearing 24 which serves to steady the upper end of the screw. Although not shown in the drawings, the load due to the weight of the sleeves 16 and the cross-rail structure 17 upon the screw 20 may be relieved by counterbalance weights, if desired. On the cross-rail 17 of each unit there are two sliding box structures 25—25, each of which has secured thereto a saw carriage 26. Each box structure is axially movable on the supporting cross-rail by the actuation of laterally disposed screw members 27—27 which are each in threaded engagement with a nut 28 on the box structure. The actuating screws for each box structure are continued to the other box structure where they are supported in slide bearings as shown at 29. The actuating screws for each box structure are provided at their ends with similar sprockets 30, as shown in Figure 4, which are driven by a common chain 31 from a motor 32, the driving motor for one box being mounted on one of the sleeves 16, and the driving motor for the other box of a unit being supported on the other sleeve 16 of that unit. With this arrangement, it will be apparent that the saws may be individually moved back and forth along the cross-rail.

Referring to Figures 2 and 3, it will be observed that each saw carriage 26 is secured to a box structure 25 by means of four (4) bolts 33 which are located at four (4) corners of a square platform 34 which forms a part of the saw carriage. The saw carriage is additionally supported upon a centrally disposed bolt 35 which enables the saw carriage to be temporarily supported and pivoted, when the bolts 33 are removed, to locate the saw in any one of the positions corresponding to the side of a square.

In addition to the above adjustment of the saw carriage, each saw is angularly adjustable so that it may be utilized in making not only vertical cuts but also inclined and horizontal cuts.

The saw carriage 26 comprises a box-like structure consisting of a lower platform 37 which is provided with slideways 38—38 to which the saw driving motor 39 is secured. The lower platform is suspended below the upper platform 34 and disposed in a corresponding position relative thereto by means of two adjacently and right angularly disposed side walls 40 and 41, and a corner post 42. This construction, it will be apparent, leaves two sides of the carriage open so that the motor may be properly ventilated and access may be had thereto to conveniently adjust the same along the slideways 38—38. The driving shaft of the motor 39 is provided with a sprocket 43 which is connected to a sprocket 44 on shaft 45 through a chain 46. A split box bearing 47 rotatably supports a saw head 48 to enable the saw to be disposed for making vertical, horizontal or angular cuts. Referring to Figure 8, a saw arbor 49 is rotatably supported within a tubular housing 50 by means of bearings 51 and 52. The rear portion of the tubular housing 50 is extended to form a hollow shaft 53 at right angles to the housing, this hollow shaft being rotatably supported in the box bearings 47. Rotatably supported within the hollow shaft 53 is the shaft 45 bearings 54 being provided at the ends of the shaft. One end of the shaft 45 has secured thereto the sprocket 44 and the other end has secured thereto a bevel gear 55 which meshes with a bevel gear 56 on the arbor 49. At the junction of the hollow shaft 53 with the tubular housing 50, a worm gear 57 surrounds and is secured to the hollow shaft. This worm gear meshes with the worm 58 on a shaft 59 having a hand wheel 60 located in a convenient position for actuation by the operator of the machine.

With the foregoing arrangement it will be observed that movement of the hand wheel 60 in one direction or the other will cause the head 48 to be pivoted, whereby the head and consequently the saw may be adjusted to a position as shown in full line in Figure 5 wherein the saw will make a vertical cut, a vertical position of the head or an intermediary angular position thereof as shown in dotted lines.

In order to secure the head 48 in adjusted position, the outer end of the tubular housing 50 is extended as shown at 61 and provided with bolts 62, the heads of which are disposed in a segmental slot 63 in the wall 40 of the saw carriage. Obviously, the bolts 62 will be loosened when shifting the saw head 48, and, as soon as the desired adjustment is made, the head is anchored by tightening the bolts 62.

With the foregoing arrangement for driving the saw arbor 49 it will be observed that the axis of rotation of the shaft 45 is the same as that of the pivotal axis of the arbor housing 50 and that, regardless of the angular position at which the saw arbor is disposed, power will always be transmitted thereto. At the saw end of the tubular housing 50, a circumferential groove 64 is provided, as clearly shown in Figure 9, to enable a suitable saw guard and water sprayer to be supported thereon and rotated to the desired position with reference to the work being done. The saw guard and water sprayer are not shown in the drawings, and may be of any conventional type.

The projecting end of the saw arbor 49 is contracted to form a shoulder 65 and threaded to receive a clamping nut 66. In Figure 2, one manner of mounting the saw 4 on the arbor is shown. In this mounting, the saw is disposed between a pair of clamping discs or washers 67 and 68 which are clamped between the shoulder 65 and the clamping nut 66 when the nut is tightened. In this arrangement it will be observed that the arbor projects through the plane of rotation of the saw. Consequently, the depth of cut in a stone 69 placed on the platen would be limited.

A preferred method of mounting the saw is shown in Figure 9. In this arrangement, the saw blade is made into a cup wheel by securing a cup-shaped bracket 70 to the blade with its rim portion abutting one surface of the blade. The cup may be secured to the blade by means of a plurality of rivets 71 which have their heads countersunk in the blade. The bottom portion of the cup-shaped bracket is provided with a central aperture 72 for receiving the contracted end portion of the saw arbor therethrough, the bottom of the bracket abutting the shoulder 65 when the nut is tightened thereagainst. In this mounting the arbor is provided with a central passageway 72ª by means of which water or other liquid may be applied to the cut for cooling the saw and flushing out the cut. This form of mounting is advantageous in that the outer surface of the blade is free from projection, thus enabling successive cuts to be taken in the plane of an initial cut, in which case the body of the stone 69 projects past the inner surface of the saw blade. It will be evident, however, that in using this type of saw mounting, it will be necessary to break away the severed portion of the stone by virtue of the preceding cut before starting the next cut. The advantage of this type of mounting will be more evident from the following description of the use of the machine of my invention in producing various forms of finished stone.

For cutting stones having different characteristics, it is desirable to operate the saw at a different speed in one case than would be proper in another case. The machine of my invention is particularly adapted for changing the speed at which the saw is to be operated. This may conveniently and easily be accomplished by sliding the motor 39 along its slide rails 38 until the chain 46 is loosened, whereupon the sprocket 43 may be replaced with a sprocket of such size as to give the proper speed of the saw. With the proper sprocket on the driving shaft of the motor, the motor is then shifted until the chain 46 is properly tensioned.

In order that the use of the stone cutting machine of my invention may be more clearly understood, the production of a number of common forms of stone will now be described.

As diagrammatically illustrated in Fig. 10, scabbled stone is produced by setting the irregular piece of stone 69 on the platen, the saws 3 and 4 first being adjusted so as to rotate in vertical plane and being spaced apart the desired distance. As the stone is moved to the saws by virtue of the platen feed, the saws 3 and 4 will make an additional cut into the stone on both sides at the same time. As the initial cut proceeds, the operator may remove the waste stone by tapping the cut at the bottom. The successive cut, as the stone is fed by movement of the platen, is made by the two blades of unit B, which blades are secured to their arbors as shown in Figure 9 and rotate in a vertical plane so as to exactly follow in the cut of the blades 3 and 4 respectively. Inasmuch as the blades 5 and 6 are mounted as shown in Figure 9, it is possible for the upper half of the blade to slip past the cut made by the preceding blade and to continue the cut down to the bottom of the stone. This completes the sawing of the two sides of the stone, there having been four blades cutting on the stone while the platen was moved once. If the top and bottom of the stone are irregular, the block can be reset with one of the newly sawed sides down and the operation repeated to produce a stone having four finished sides.

The ends of the stone may then be sawed as shown in Figure 12. By arranging the saws 7 and 8 as shown in Figure 1, these saws also being mounted as shown in Figure 9, the forward end of the stone may be sawed by means of saw 7. In sawing this end, the platen is stationary and the saw is fed to the stone to take the first initial cut, the waste stone is then broken away and the saw again fed through to take the lower portion of the cut. The other end of the stone is sawed in the same manner by using saw 8. It is therefore evident that, with the use of the stone cutting machine of my invention, it is possible to scabble or make rectangular any large block of stone within the capacity of the machine, provided the outside stone is to be wasted by bringing the cup blade down in a series of cuts and removing the waste after each cut.

Slab stone, which is stone that has been sawed on two parallel sides to the thickness desired, may be produced by setting the blade of one of the units, for example, blades 5 and 6 as shown in Figure 1 of unit B so as to rotate in a horizontal plane. The stone is set on the platen as before and, by means of the platen feed, passes through the saws as shown in Figure 11. In producing slab stone, the slab should be held up as the cut progresses by means of wedges as shown at 73 in order that the weight of the slab will not interfere with the operation of the saws. It will also be evident that with the machine of my invention it is also possible to cut three (3)

slabs at the same time by disposing the blades of each unit in the manner just described, the blades of the respective units being located at different levels, depending upon the thickness of the stone slabs desired.

In Figure 13, I have diagrammatically illustrated the use of my machine to produce stone sawed on four sides. In this case, the blades of unit A are used to make the horizontal cut as described above for slabs, and then following with the two blades on unit B which are adjusted to make the vertical cuts through the stone at the same time the other cuts are being made. If several separations are desired, the blades of unit C may be operated similarly to the blades of unit B, thereby securing two additional cuts during the same operation.

Moulded stone is produced by setting the arbors of the first pair of blades in aligned position and connecting therebetween a spindle 74 having a plurality of carborundum wheels 75 thereon, these wheels having cutting surfaces moulded to give the shape desired. With this arrangement, the spindle 74 is driven by the arbor motor at each end and will cut a series of parallel moulded surfaces as the stone is fed thereunder. Simultaneously with the forming of the moulded surfaces, the saws of unit B, which have been adjusted to make a vertical cut, will separate the parallel moulded sections. Simultaneously with these operations, the saws 7 and 8, which have been disposed to make a horizontal cut, will pass through the stone and will cut the moulded portions into strips of desired thickness. The strips of moulding may then be cut into desired lengths by readjusting blade 8 of unit C for a vertical transverse cut, as shown in Figure 1. The stone is then moved relative to the blade 8 to a position such that when the blade 8 is fed through the stone the strips of moulding will be jointed or cut to the desired lengths. Successive cuts may then be taken in a similar manner. The foregoing process produces finished stones that are sawed on all six sides and in addition a moulded finish is produced on one of the sides, all of which is accomplished without resetting the stones from which the moulding portions have been cut. The manner of transversely cutting the moulded strips is clearly shown in Figure 15.

Stone ashlar, or stone sawed on six sides, either with or without a carborundum finish on one of the flat sides, is produced in the same manner as moulded stone, except that instead of using a spindle having a plurality of carborundum moulded wheels thereon, a flat carborundum on a spindle is used. This carborundum wheel will skim off a thin coat of stone, leaving a smooth carborundum finish. The horizontal and vertical cuts and transverse cuts are made in the same manner as in producing the moulded stone.

Although I have described the principal uses of the stone sawing machine of my invention, it will readily be apparent to one skilled in the art that my machine is so constructed and designed as to be readily adaptable to a great number of other production methods. It is contemplated that various changes in the arrangement and size of the machine, the addition of more or less units and other changes in degree may be made without departing from the spirit of the invention.

The construction of the machine of my invention further enables the mounting of lathe centers on the platen, whereby it is possible to grind stones with multiple carborundum wheels.

From the foregoing description of the construction of the machine of this invention, and the manner of its operation in producing various finished shapes of stone, it will be apparent that a stone cutting machine is provided which may be located at the quarry and that it is so designed and constructed as to enable a plurality of working tools to be applied simultaneously, thereby materially speeding up the production of finished stone; a machine in which it is not necessary to reset the stone in order to effect a plurality of different cuts; a machine which may be used to quickly and economically produce moulded stone; which is provided with a novel adjustment for the various saws which enables the saws to be conveniently and quickly disposed for making horizontal, vertical and angular cuts; and in which novel means are provided for mounting the saw blade on its arbor, making it possible to follow an initial cut with successive cuts through lower portions of the stone in the same plane of the initial cut.

Now, it is of course to be understood that although I have described in detail the preferred embodiment of my invention, the invention is not to be thus limited but only insofar as defined by the scope and spirit of the appended claims.

I claim as my invention:

1. A stone sawing machine comprising a carriage structure, a head structure pivoted near one end on the carriage for angular adjustment in a vertical plane, an arbor rotatably mounted in and angularly adjustable with the head structure, a saw carried by said arbor at the end adjacent the pivot of the head, means at the other end of the head to anchor the head in adjusted position, and power means connected to the arbor irrespective of the angular position of the head structure and arbor.

2. A stone sawing machine comprising a carriage structure, a head swingably supported adjacent one of its ends on said carriage for angular adjustment, means for anchoring the free end of the head in adjusted position, an arbor rotatably supported in the head, the axis of said arbor being at right angles to the pivotal axis of the head, a saw secured to said arbor for rotation therewith, a drive shaft having its axis coincident with the pivotal axis of the head, bevel gears connecting the drive shaft to the arbor, said gears being operable to transmit power irrespective of the adjusted position of the head.

3. A stone sawing machine comprising a carriage structure, a head pivotally supported adjacent one of its ends on said carriage for angular adjustment, means actuable to swing the head about its pivot, means for anchoring the free end of the head in adjusted position, an arbor rotatably supported in the head, the axis of said arbor being at right angles to the pivotal axis of the head, a saw secured to said arbor for rotation therewith, a drive shaft having its axis coincident with the pivotal axis of the head, bevel gears connecting the drive shaft to the arbor, said gears being operable to transmit power irrespective of the adjusted position of the head.

4. A stone sawing machine comprising a carriage structure having a pivotal support to enable angular adjustment of the carriage in a horizontal plane, a head pivotally supported on the carriage for angular adjustment in a vertical plane, an arbor rotatably supported in and angularly adjustable with said head, a rotary saw carried by the arbor, and a drive shaft geared to the arbor, said drive shaft being disposed with its axis coincident with the pivotal axis of the head, whereby power may be transmitted to said arbor irrespective of the adjusted positions of the carriage and arbor.

5. A stone cutting machine comprising in combination a movable platen adapted to have a stone to be sawed secured thereto, a series of saws disposed for rotation at different levels in the same plane, one in advance of the other, a rotatable arbor connected to each of said saws, the arbors for the saws following the first saw each being connected so that the plane of rotation of the saw is outwardly disposed relative to the connected end of the arbor, whereby the cut of the first saw may be successively deepened, the severed portions of the stone being broken away as the sawing continues, and means for moving the platen.

6. A stone cutting machine comprising a support, a pair of swingably mounted arbors on said support, means to individually drive each arbor, and means adjustable to axially align said arbors, said arbors being adapted to individually receive and drive a tool or operate as a unit to drive a tool common to both arbors.

7. A stone working machine comprising a support, a carriage having sections with surfaces in abutment, one of said sections being slidably mounted on said support, an arbor adapted to receive a tool carried by the other of said sections, means to drive said arbor, means to angularly adjust said arbor relative to the axis of the carriage, a pivot member connecting said sections to enable relative rotation thereof, and bolts to secure said sections in adjusted position, said bolts being spaced at 90-degree intervals on a common bolt circle having its center coincident with the axis of said pivot, whereby said other section may be moved to enable actuation of the tool in positions in quadrature.

In testimony whereof I have hereunto subscribed my name at Chicago, Cook County, Illinois.

ARTHUR E. NELSON.